(12) United States Patent
Kimura et al.

(10) Patent No.: US 8,564,418 B2
(45) Date of Patent: Oct. 22, 2013

(54) REMOTE CONTROLLER

(75) Inventors: Mitsuo Kimura, Tokyo (JP); Takafumi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 525 days.

(21) Appl. No.: 12/922,065

(22) PCT Filed: Feb. 18, 2009

(86) PCT No.: PCT/JP2009/000673
§ 371 (c)(1),
(2), (4) Date: Sep. 10, 2010

(87) PCT Pub. No.: WO2009/141939
PCT Pub. Date: Nov. 26, 2009

(65) Prior Publication Data
US 2011/0019106 A1    Jan. 27, 2011

(30) Foreign Application Priority Data
May 19, 2008  (JP) .................................. 2008-130927

(51) Int. Cl.
*G05B 11/01* (2006.01)
(52) U.S. Cl.
USPC ........................ 340/12.22; 340/12.1; 345/102

(58) Field of Classification Search
USPC .................. 340/12.5, 1.1, 12.1, 12.15, 12.22; 345/102
See application file for complete search history.

(56) References Cited

U.S. PATENT DOCUMENTS

| 4,728,949 A | * | 3/1988 | Platte et al. ................. 340/12.52 |
| 4,755,883 A | * | 7/1988 | Uehira ........................... 386/291 |
| 5,754,117 A | * | 5/1998 | Inamori et al. ............... 340/12.5 |
| 2001/0041605 A1 | | 11/2001 | Suzuki |

FOREIGN PATENT DOCUMENTS

| JP | 5-14978 A | 1/1993 |
| JP | 7-309170 A | 11/1995 |
| JP | 10-199683 A | 7/1998 |
| JP | 2001-168983 A | 6/2001 |

* cited by examiner

*Primary Examiner* — Brian Zimmerman
*Assistant Examiner* — Sara Samson
(74) *Attorney, Agent, or Firm* — Birch, Stewart, Kolasch & Birch, LLP

(57) ABSTRACT

A remote controller 2, which is removably mountable in a remote control holder 13 of an onboard display 1, includes a power supply (battery 201) having a light emitting element (LED 202) for illuminating buttons. A control unit (microprocessor 203) of the remote controller 2 detects a mounted or unmounted state of the remote controller 2, and switches the control method of the luminance for light emitting element for illuminating buttons in accordance with the mounted or unmounted state detected.

1 Claim, 4 Drawing Sheets

REMOTE CONTROLLER

TECHNICAL FIELD

The present invention relates in particular to a remote controller preferably used for an onboard display mounted on a back seat of a vehicle.

BACKGROUND ART

An onboard information device can handle a variety of highly entertaining video and audio contents to make an occupant in a vehicle comfortable, and it has been becoming common to provide a plurality of AV (Audio Visual) devices in the vehicle for playing back the video and audio contents.

For example, as for an onboard display provided for a back seat occupant for viewing, it is mounted not only on the ceiling of the vehicle, but also on the back of the front seats sometimes. Alternatively, it is often mounted on each seat for exclusive use recently. In any of the foregoing mounting modes, to ensure convenience of a user, a wireless remote controller is employed for operating the onboard display. The remote controller can be placed in the remote control storage space of the onboard display so as to put it out of the way when the onboard display is not used.

The removable remote control of the onboard display often includes a light emitting element (like an LED: Light Emitting Diode) for illuminating buttons by considering cases of using it during night or in a comparatively dark environment.

To light the light emitting element for illuminating buttons with stability, it is necessary to send a rated current through it. Accordingly, to carry out luminance control of the light emitting element for illuminating buttons, pulse width modulation (PWM) control is essential which varies duty (ratio of ON/OFF of the pulse width) without varying the current (voltage) flowing through the light emitting element for illuminating buttons.

Thus, the conventional onboard information device such as an audio device having a light emitting element for illumination like an LED acquires from the vehicle a signal referred to as a rheostat signal with the duty corresponding to the luminance for controlling the luminance of the illumination, and carries out luminance control by converting it to a DC voltage corresponding to the duty and by applying it to the light emitting element for illumination like an LED (see Patent Document 1, for example).

Patent Document 1: Japanese Patent Laid-Open No. 10-199683/1998.

As described above, to light the light emitting element for illumination like an LED with stability, it is necessary to employ the pulse width modulation that controls the luminance by varying the duty while causing the rated current to flow while fixing the applied voltage. According to the technique disclosed in Patent Document 1, to control the luminance of the light emitting element for illumination like an LED in response to the rheostat signal, it supplies the DC voltage corresponding to the rheostat signal from the onboard display side. Accordingly, when dimming the illumination (lowering the DC voltage), since the current value flowing through the light emitting element for illumination like an LED reduces, it is feared that unstable lighting state with luminance unevenness due to variation of the luminance can occur at low luminance.

Let us suppose that light emitting element like an LED is used for illuminating buttons of the remote controller. In this case, to acquire the rheostat signal and perform the duty variable control by the remote controller itself, it must include a comparatively high-performance microprocessor, which will lead to a cost increase and is not practical.

The present invention is implemented to solve the foregoing problems. Therefore it is an object of the present invention to provide a remote controller capable of reducing the variation of the luminance at low luminance, and of achieving the luminance control of the light emitting element for illuminating buttons with a comparatively low performance microprocessor.

DISCLOSURE OF THE INVENTION

To solve the foregoing problems, a remote controller in accordance with the present invention is removably mountable in a remote control holder of an onboard display, and includes: an internal power supply having a light emitting element for illuminating buttons; and a control unit for detecting a mounted or unmounted state in the remote control holder, and for switching a luminance control method of the light emitting element for illuminating buttons in accordance with the mounted or unmounted state detected.

According to the present invention, it can provide a remote controller capable of reducing the variation of the luminance at low luminance, and of achieving the luminance control of the light emitting element for illuminating buttons with a comparatively low performance microprocessor.

BEST MODE FOR CARRYING OUT THE INVENTION

The best mode for carrying out the invention will now be described with reference to the accompanying drawings to explain the present invention in more detail.

Embodiment 1

Figure 1:
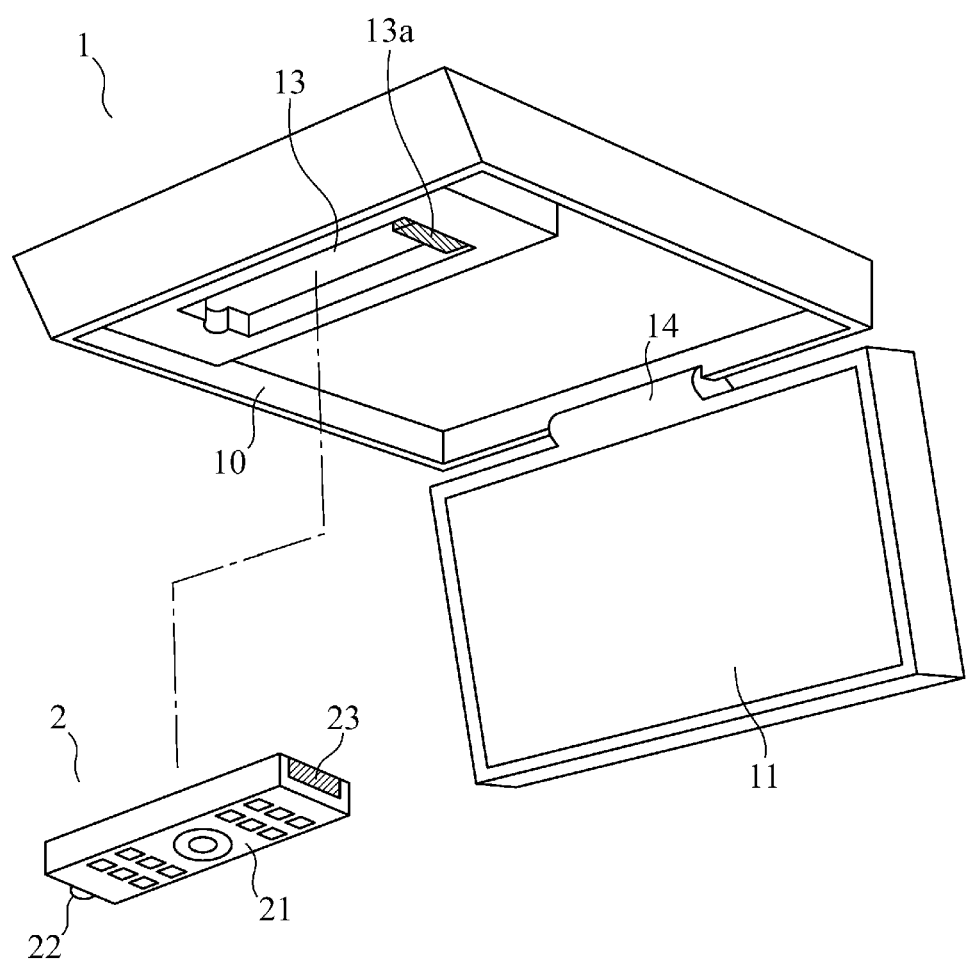
FIG. 1 is a view showing an external construction of an onboard display.

FIG. 1 is a view showing an external construction of an onboard display. It shows, as an onboard display, an onboard display (referred to as "display main body 1" from now on) mounted on the ceiling of the vehicle for an occupant in the back seat to view, and a remote controller 2 removably mountable in the remote control holder 13 of the display main body 1.

As shown in FIG. 1, the onboard display of the embodiment 1 in accordance with the present invention includes the onboard display 1 with the remote control holder 13, and the remote controller 2 which is removably mountable in the remote control holder 13 and has a power supply having a light emitting element (LED not shown) for illuminating buttons. The remote controller 2 detects its mounted or unmounted state in the remote control holder 13, and operates in such a manner as to switch the control method of the luminance for the light emitting element for illuminating buttons in response to the mounted or unmounted state detected. Its details will be described below.

The display main body 1 has a liquid crystal panel (referred to as "LCD panel 11" from now on). The LCD panel 11 is swingably mounted (enabled to open and close) on the device main body 10 fixed to the in-vehicle ceiling by a hinge 14. Here, the LCD panel 11 is shown in its open state for viewing contents. Incidentally, the LCD panel 11 is constructed in such a manner as to be shut on the hinge 14 when no contents are viewed.

The display main body 1 has input terminals for external video and audio, as well. In addition, a comparatively high-class type has a memory card slot or the like not shown, and has specifications of incorporating various functions for improving in-vehicle entertainment.

Incidentally, the display main body 1 is sometimes mounted on the back of the front seats besides the in-vehicle ceiling, and is often provided for each seat for exclusive use recently.

In any of the foregoing mounting modes, to ensure convenience of a user, the wireless remote controller 2 is employed for operating it. The remote controller 2 can be kept in the display main body 1. For this purpose, the display main body 1 has the remote control holder 13 to keep the remote controller 2. The remote controller 2 is used as an operation panel when the LCD panel 11 is closed.

The remote controller 2 is usually arranged at the size to fit in the palm, and has various operation buttons 21 on its surface. In addition, inside the operation buttons 21, an LED for illuminating the buttons is mounted. As for the LED for illuminating the buttons, it will be described later with reference to FIG. 2 onward.

In addition, the remote controller 2 has an infrared emitting section 22 (diode) mounted on its top for transmitting infrared rays. It transmits information (operation commands) for operating the display main body 1. Incidentally, the remote controller 2 has, on its end opposite to the top where the infrared emitting section 22 is attached, an electrode 23 for conducting communication with the display main body 1 when it is kept in the remote control holder 13 of the display main body 1. Thus, the display main body 1 has an electrode 13a mounted at the position that makes contact with the electrode 23 when the remote controller 2 is fit to the remote control holder 13.

Figure 2:
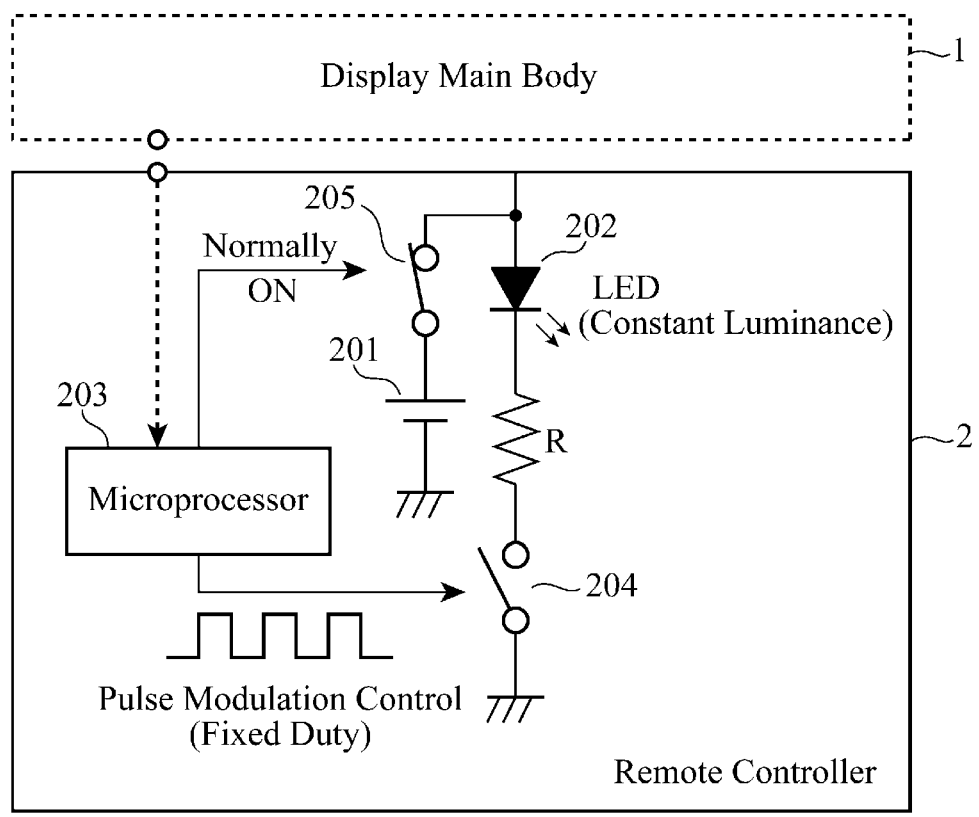
FIG. 2 is a diagram showing an internal configuration in a state in which a remote controller of an embodiment 1 in accordance with the present invention is removed from an onboard display.
Figure 3:
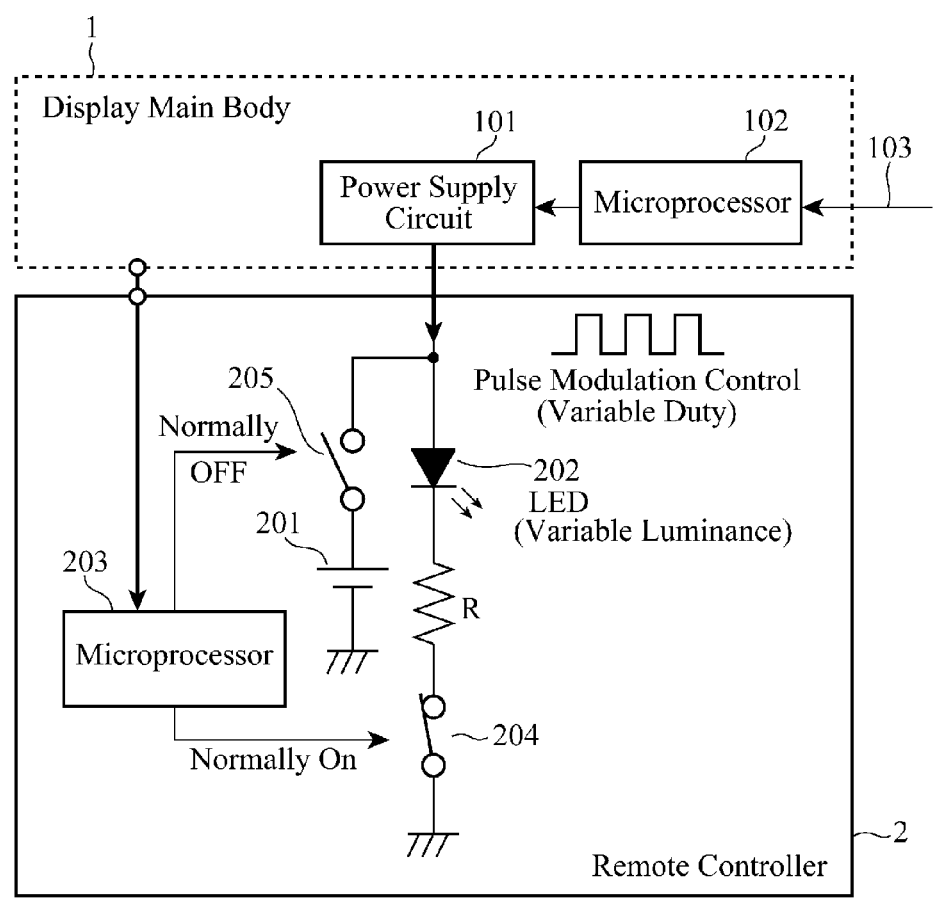
FIG. 3 is a diagram showing an internal configuration in a state in which the remote controller of the embodiment 1 in accordance with the present invention is mounted on the onboard display.

FIG. 2 and FIG. 3 are diagrams showing internal configurations in the mounted and unmounted states of the remote controller of the embodiment 1 in accordance with the present invention in the onboard display: when the remote controller 2 is removed (FIG. 2); and when the remote controller 2 is mounted (FIG. 3).

As is clear from FIG. 2 and FIG. 3, when the remote controller 2 is removed (in the state not connected to the display main body 1), it is supplied with power from an internal power supply, a battery 201; and on the other hand, when it is mounted (in the state connected to the display main body 1), it is supplied with power from a power supply circuit 101, a power supply within the display main body 1, so that it operates in either case.

The remote controller 2 switches, in accordance with a single operation mode (unmounted state) or a mounted mode in the display main body 1 (mounted state), the luminance control method so that it can achieve a stable illuminated state consistently in either mounted state or unmounted state owing to the operation that will be described later.

Incidentally, in FIG. 2 and FIG. 3, components designated by the same reference numerals as those of FIG. 1 are assumed to have the same names and functions as their counterparts of FIG. 1.

As shown in FIG. 3, the display main body 1 has a power supply circuit 101 and a comparatively high-performance microprocessor 102.

Incidentally, as for the rheostat signal acquired from the vehicle not shown, it is supplied to the microprocessor 102 via a rheostat signal line 103.

In addition, as shown in FIG. 2 and FIG. 3, the remote controller 2 has the battery 201 as the internal power supply; an LED 202 as the light emitting element for illuminating buttons; a comparatively low performance microprocessor 203 as a control means for detecting the mounted or unmounted state of the remote controller 2, and for switching the control method of the luminance for the light emitting element for illuminating buttons in accordance with the detected mounted or unmounted state of the remote controller 2 in the display main body 1; and switches 204 and 205.

The LED 202 constitutes a series circuit with a resistance R and the switch 204 having its one end grounded. The series circuit is connected in parallel with the battery 201 via the switch 205. Both the switch 204 and switch 205 undergo ON/OFF control by the low performance microprocessor 203. Incidentally, the switch 205 is connected in series with the battery 201.

Figure 4:
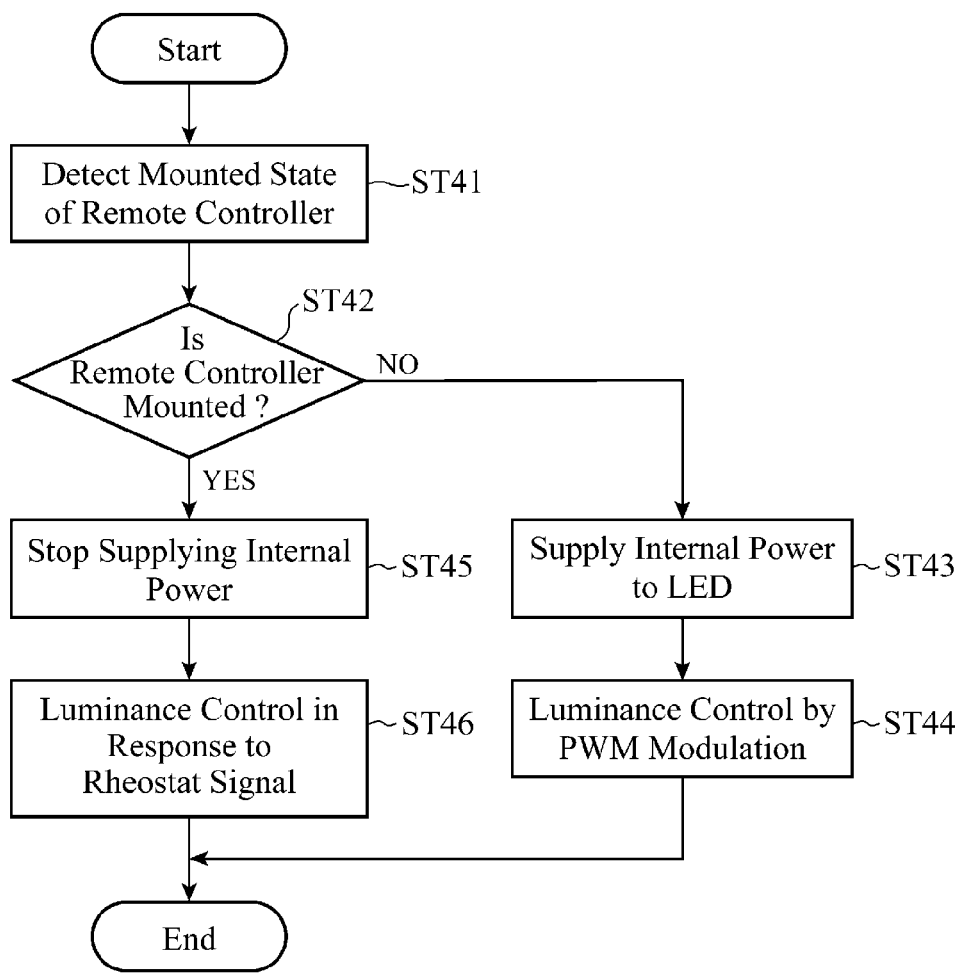
FIG. 4 is a flowchart showing the operation of the remote controller of the embodiment 1 in accordance with the present invention when it is put on or removed from the onboard display.

FIG. 4 is a flowchart showing the operation of the embodiment 1 in accordance with the present invention, which mainly pays attention to the operation of the microprocessor 203 in the remote controller 2.

Referring to the flowchart in FIG. 4, the operation of the embodiment 1 in accordance with the present invention shown in FIG. 2 and FIG. 3 will be described in detail below.

First, according to the signal acquired through the electrode 23, the microprocessor 203 of the remote controller 2 detects the mounted state of the remote control (step ST41).

During the single operation of the remote controller 2, in which case a decision of the unmounted state is made ("No" at step ST42), the microprocessor 203 turns on the switch 205 to supply power from the internal battery 201 to the LED 202 as shown in FIG. 2 (step ST43). Then, it carries out the luminance control by turning the switch 204 on and off by the PWM control of the supply timing (step ST44).

As described above, during the single operation of the remote controller 2 in which case the decision of the unmounted state is made, the microprocessor 203 drives the LED 202 by the PWM control using an internal port not shown.

In this case, during the ON state, it sends the rated current through the LED 202. For example, to drive the LED 202 at a current value of 1/10 of the rating and to achieve the same luminance as the conventional case, it is enough for the PWM control to perform the PWM control with the ON duration of 10% and OFF duration of 90%. This enables the rated current to flow through the LED 202 during driving, and hence the remote controller 2 can achieve a stable illuminated state.

On the other hand, when a decision is made in the remote control mounted mode decision processing at step ST42 that the remote controller 2 is in the mounted state ("YES" at step ST42), the microprocessor 203 turns off the switch 205 to stop the power supply to the LED 202 from the battery 201, the internal power supply, as shown in FIG. 3 (step ST45), and carries out the luminance control by controlling the supply duration of the power by the PWM control in response to the rheostat signal (rheostat signal line 103) fed from the vehicle to the display main body 1 (step ST46).

Thus, to control the button luminance by the LED 202 in response to the rheostat signal, the display main body 1 side supplies power passing through the PWM control in accordance with the rheostat signal. In this case, the switch 204 is kept on to drive the LED 202.

In this way, the remote controller 2 carries out the luminance control by supplying the LED 202 with the output of the power supply circuit 101 passing through the PWM control by the microprocessor 102 in the display main body 1 in accordance with the duty of the rheostat signal, thereby reducing the variation in the luminance at the low luminance.

As described above, as for the drive of the LED 202, when the remote controller 2 is in the unmounted state, it is performed by the PWM control. In the mounted state, however, it is switched to the continuous drive (always ON) mode. Thus, independently of the state of the rheostat signal, the microprocessor 203 in the remote controller 2 can perform the luminance control for illuminating buttons in accordance with only the ON/OFF control of the power supply. In other words, since the microprocessor 203 need not acquire the rheostat information, a comparatively low performance, low cost type microprocessor can achieve it.

In this way, since the rated current flows through the LED 202 during its drive, it can always achieve stable illuminated state. This promises to be strikingly effective when the rheostat adjustment is controlled in such a manner as to reduce the luminance.

Incidentally, according to the remote controller 2 of the embodiment in accordance with the present invention described above, it switches the driving control of the LED 202 to the continuous ON mode in the mounted state. In this state, if the power supply is performed by the PWM control, and the drive of the LED 202 is also performed by the PWM control in the same manner as in the unmounted state, the power supply and the driving control cannot be synchronized, which will result in a flicker of the illumination, and hence the combination is inappropriate.

As described above, according to the remote controller of the embodiment 1 in accordance with the present invention, it switches the luminance control method of the light emitting element for illuminating buttons in accordance with the mounted or unmounted state of the remote controller 2 so that it performs the luminance control in conjunction with the rheostat signal of the vehicle in the mounted state, and performs the luminance control based on the PWM control in the unmounted state. Accordingly, it can always achieve the stable emitting state in both the mounted state and unmounted state. In addition, the remote controller 2 can reduce the consumption of its internal power supply (battery 201), and as for its internal microprocessor 203, it offers an advantage of being able to use comparatively low performance, low cost microprocessor.

INDUSTRIAL APPLICABILITY

As described above, in a remote controller which is removably mountable in a remote control holder of an onboard display and has an internal power supply including a light emitting element for illuminating buttons, the remote controller in accordance with the present invention is configured in such a manner as to have a control unit for detecting a mounted or unmounted state in the remote control holder, and for switching a luminance control method of the light emitting element for illuminating buttons in accordance with the mounted or unmounted state detected. Therefore it can reduce the variation of the luminance at the low luminance, and can achieve the luminance control of the light emitting element for illuminating buttons with a comparatively low performance microprocessor. Accordingly, it is suitably used as a remote controller removably mountable in an onboard display that is installed for a back seat occupant to view.

What is claimed is:

1. A remote controller removably mountable in a remote control holder of an onboard display having a power supply circuit, said remote controller comprising:

a light emitting element that illuminates a button of the remote controller, the light emitting element being supplied with power from the power supply circuit during a mounted state where the remote controller is mounted in the remote control holder;

an internal power supply that supplies power to the light emitting element during a removed state where the remote controller is removed from the remote control holder; and a control unit that detects whether the remote controller is in the mounted state or the removed state, the control unit switching a luminance control method of the light emitting element in accordance with the state detected, wherein the control unit:

when the remote controller is in the mounted state, performs luminance control by pulse width modulation in conjunction with a rheostat signal of a vehicle by receiving power supply from the power supply circuit of the onboard display; and when the remote controller is in the removed state, supplies power from the internal power supply to the light emitting element, and performs luminance control by pulse width modulation with a predetermined duty ratio at a fixed voltage.

* * * * *